(12) United States Patent
Greuet (10) Patent No.: US 9,602,165 B2
(45) Date of Patent: Mar. 21, 2017

(54) APPARATUS AND METHOD FOR A DISPLAY HAVING AN INDUCTION COIL

(75) Inventor: Jean-Baptiste Greuet, Ulm (DE)

(73) Assignee: Nokia Technologies Oy, Espoo (FI)

( * ) Notice: Subject to any disclaimer, the term of this patent is extended or adjusted under 35 U.S.C. 154(b) by 386 days.

(21) Appl. No.: 13/576,402

(22) PCT Filed: Feb. 2, 2010

(86) PCT No.: PCT/IB2010/050454
§ 371 (c)(1),
(2), (4) Date: Aug. 1, 2012

(87) PCT Pub. No.: WO2011/095841
PCT Pub. Date: Aug. 11, 2011

(65) Prior Publication Data
US 2012/0309310 A1    Dec. 6, 2012

(51) Int. Cl.
H04B 5/00     (2006.01)

(52) U.S. Cl.
CPC ......... *H04B 5/0031* (2013.01); *H04B 5/0081* (2013.01)

(58) Field of Classification Search
CPC ............................................... H04B 5/00–5/02
USPC ..................................... 455/41.1, 90.2, 566
See application file for complete search history.

(56) References Cited

U.S. PATENT DOCUMENTS

| | | |
|---|---|---|
| 5,771,438 A | 6/1998 | Palermo et al. |
| 6,456,883 B1 | 9/2002 | Torgerson et al. |
| 2004/0098068 A1 | 5/2004 | Carbunaru et al. |
| 2004/0133787 A1 | 7/2004 | Doughty et al. |
| 2004/0189625 A1* | 9/2004 | Sato .............................. 345/204 |
| 2005/0141256 A1 | 6/2005 | Yamazaki et al. |
| 2005/0281425 A1 | 12/2005 | Greuet et al. |
| 2006/0061512 A1 | 3/2006 | Asano et al. |
| 2006/0126873 A1* | 6/2006 | Lee ...................... H04R 25/554 381/312 |
| 2006/0164305 A1 | 7/2006 | Chen et al. |
| 2008/0061945 A1 | 3/2008 | Hoshina |
| 2009/0046879 A1* | 2/2009 | Knudsen et al. ............. 381/315 |
| 2009/0167699 A1 | 7/2009 | Rosenblatt et al. |

(Continued)

FOREIGN PATENT DOCUMENTS

| | | |
|---|---|---|
| CN | 1356779 | 7/2002 |
| CN | 1383526 | 12/2002 |

(Continued)

OTHER PUBLICATIONS

Rufus P. Turner, Stan Gibilisco, The Illustrated Dictionary of Electronics, 1991, McGraw-Hill, Inc., Fifth edition, p. 43.*

(Continued)

*Primary Examiner* — Gennadiy Tsvey
(74) *Attorney, Agent, or Firm* — Harrington & Smith (57) ABSTRACT

An apparatus including a touch panel display component having at least one display part and an electrically conductive part electrically isolated from the display part. The electrically conductive part forms an induction loop incorporating a magnetic field induction capability. The magnetic field induction loop is used for hearing aid coupling, wireless charging, or contactless data communication. An electrostatic discharge component may be included to provide a discharge path to protect the display.

14 Claims, 9 Drawing Sheets

(56) References Cited

U.S. PATENT DOCUMENTS

2010/0136905 A1* 6/2010 Kristiansen .......... H04B 5/0075
                                                                    455/41.1
2010/0184479 A1* 7/2010 Griffin, Jr. ............. H04B 1/034
                                                                    455/557
2010/0315389 A1* 12/2010 Sorrell et al. ................. 345/204

FOREIGN PATENT DOCUMENTS

| CN | 1783894 A | 6/2006 |
|----|-----------|--------|
| EP | 1271899 A1 | 1/2003 |
| EP | 1903755 A2 | 3/2008 |
| EP | 1981176 A1 | 10/2008 |
| RU | 3661 | 2/1997 |
| RU | 2008103359 | 8/2009 |
| WO | 98/24215 A1 | 6/1998 |
| WO | 20070051911 | 10/2007 |

OTHER PUBLICATIONS

Near field communication, located at https://en.wikipedia.org/wiki/Near_field_communication.*

International Search Report and Written Opinion received for corresponding International Patent Application No. PCT/IB2010/050454, dated Oct. 14, 2010, 13 pages.

Office Action received for corresponding Russian Application No. 2012136919, dated Oct. 3, 2013, 7 pages.

Office Action received for corresponding Chinese Application No. 201080062978.0, dated Mar. 4, 2014, 10 pages.

Office action received for corresponding Chinese Patent Application No. 201080062978.0, dated Sep. 10, 2014, 6 pages of office action and 3 pages of office action translation Available.

Office action received for corresponding Chinese Patent Application No. 201080062978.0, dated Dec. 15, 2014, 3 pages of office action and 4 pages of office action translation.

* cited by examiner

APPARATUS AND METHOD FOR A DISPLAY HAVING AN INDUCTION COIL

RELATED APPLICATION

This application was originally filed as PCT Application No. PCT/IB2010/050454 filed Feb. 2, 2010.

The present invention relates to apparatus for magnetic field induction. The invention further relates to, but is not limited to, apparatus for magnetic field induction in portable devices.

Magnetic induction for hearing aid coupling, in other words the generation of magnetic fields that are sensed by a hearing aid device in (T)-coil mode has been introduced within some electronic devices in order to achieve hearing aid compatibility (HAC) with common devices such as mobile telephones or media playback devices. In some previous examples the transducer is a loop or coil implemented within an earpiece component within the device.

In some other examples the electronic device implements the transducer away from the earpiece. For example the printed circuit board within the electronic device may have conductive coils suitable to generate a magnetic field or internal conductive pathways within the electronic device separate from the circuit board similarly generating the magnetic field.

Such examples however require complex integration design and require valuable circuit board area or device volume to implement. Furthermore as the electronic devices themselves are reduced in size in order to make the device more portable the electronic components within the electronic device are similarly reduced in size. Hence available area for conductive path implementation on the circuit board is decreased and/or the volume within the device is decreased for freestanding implementations.

This invention thus proceeds from the consideration that by implementing a signal coil or coils within display components it may be possible to improve magnetic field generation for inductive applications such as hearing aid, charging, or contactless data communication for mobile apparatus.

Embodiments of the present invention aim to address the above problem.

There is provided according to a first aspect of the invention an apparatus comprising: a display component comprising at least one display part and an electrically conductive part electrically isolated from the at least one display part.

The conductive part is preferably adjacent to and at least partially surrounds the at least one display part.

The conductive part is preferably comprises an induction coil.

The induction coil is preferably a single loop of conductive material.

The induction coil is preferably at least two loops of conductive material.

The at least two loops of conductive material are preferably at least one of: a single layer comprising at least two loops of conductive material; and at least two serially connected layers, each layer comprising at least one loop of conductive material.

The apparatus may further comprise at least one electrostatic discharge component, the conductive part is connected to the at least one electrostatic discharge component, wherein the conductive part and electrostatic discharge component are configured to provide a discharge path to protect the display part.

The apparatus may further comprise a radio frequency transceiver, the conductive part is connected to the radio frequency transceiver, wherein the conductive part is configured to provide an antenna path for the radio frequency transceiver.

The apparatus may further comprise a power management unit, the conductive part being connected to the power management unit, wherein the conductive part is configured to magnetically transfer power between the apparatus and at least one further apparatus.

The apparatus may further comprise an audio signal generator, the conductive part being connected to the audio signal generator, wherein the conductive part is configured to magnetically transfer the output of the audio signal generator to at least one further apparatus.

The conductive part is preferably configured to generate a hearing aid compatible magnetic field.

The display component preferably comprises at least one layer and wherein the at least one display part and the electrically conductive part are located on or in at least one of the at least one layer.

The display component preferably comprises a touch interface display and the display part comprises at least one touch sensitive part.

According to a second aspect of the invention there is provided a method comprising: presenting visual information with a display; and providing an induction coil electrically isolated but located on or in the display.

The method may further comprise inputting a touch input with the display.

According to a third aspect of the invention there is provided a computer-readable medium encoded with instructions that, when executed by a computer perform: presenting visual information with a display; and controlling an induction coil electrically isolated but located on or in the display.

According to a fourth aspect of the invention there is provided an apparatus comprising: display means comprising at least one display part and an electrically conductive part electrically isolated from the at least one display part.

An electronic device may comprise apparatus as described above.

A chipset may comprise apparatus as described above.

BRIEF DESCRIPTION OF DRAWINGS

For better understanding of the present invention, reference will now be made by way of example to the accompanying drawings in which.

DETAILED DESCRIPTION OF SOME EMBODIMENTS

The following describes apparatus and methods for generating of magnetic fields in electronic devices or apparatus. In this regard reference is made to FIG. 1 which shows a schematic diagram of an exemplary electronic device or apparatus 10 which may incorporate a magnetic field generating components according to embodiments of the application.

The apparatus may for example be a mobile terminal or user equipment for a wireless communication system. In other embodiments the electronic device or apparatus may be an audio player (also known as MP3 players), a media player (also known as MP4 players), or an electronic book reader.

In some other embodiments the apparatus may be any suitable electronic device such as a personal data assistant (PDA), personal computer (such as a net book, tablet, or other mobile personal computer), or an electronic wallet. The apparatus in some embodiments can be both fixed in position or be mobile. Although the following examples typically describe a mobile or portable apparatus, it would be appreciated that embodiments may be fixed in position, for example an Automatic Teller Machine (ATM) apparatus comprising a touch panel component similar to those described hereafter would have advantages similar to those described below with respect to mobile apparatus.

Figures 1, 2:
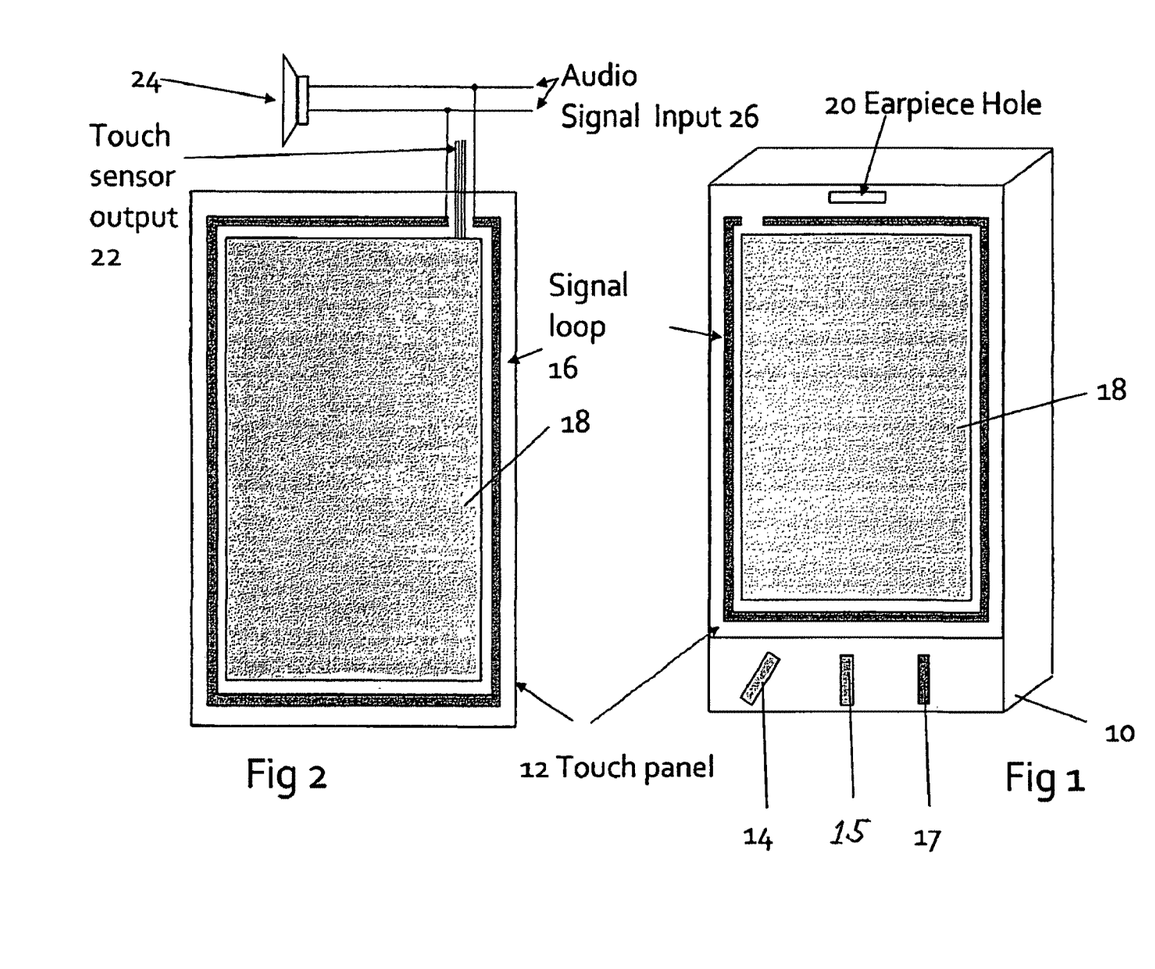
FIG. 1 shows schematically an electronic device employing embodiments of the application.
FIG. 2 shows schematically the touch sensor component shown in FIG. 1 in further detail according to some embodiments.

The apparatus 10 comprises a touch panel component 12 mounted on the frame of the apparatus and suitable for providing the user with a user interface for inputting touch related data. The touch panel component 12 comprises a touch sensitive area 18 configured to detect and relay touch data. Furthermore the touch panel component 12 further comprises a conductive path or signal loop 16 which at least partially surrounds the touch sensitive area 18. It would be appreciated that the above and following embodiments and examples may also be applicable to non touch panel displays. In such non-touch interface embodiments it would be understood that the display components would comprise a display part which could be configured to provide visual information to the user of the apparatus and a conductive loop for providing a signal loop suitable to operate as an induction loop for generating and detecting magnetic field energy.

For example where the apparatus display is a liquid crystal display (LCD) technology the conductive loop which would be suitable for providing the induction loop as described hereafter may be implemented on at least one of the conductive layers used in the LCD technology. For example the signal loop may be implemented on at least the thin film transistor (TFT) layer or the layer used as contacts to provide a potential difference across the LCD cells. It would be also understood that similar signal loop embodiments may be implemented on any suitable conductive layer used in any suitable display technology—such as contact layers in light emitting diodes, plasma displays etc.

Furthermore although the following examples describe the conductive path or signal loop which partially surrounds the touch sensitive area it would be appreciated that other configurations are implementable. For example in some embodiments the conductive path or signal loop 16 could also be implemented at least partially within the touch sensitive area 18. In such examples the topology of the touch sensitive area is complicated by the implementation of electrical connections or "bridges" between the touch sensitive areas or islands between the conductive path/signal loop.

The conductive path in some embodiments comprises a perimeter conductive conduit. The perimeter conductive conduit in some embodiments substantially surrounds the touch sensitive area and has at least one break in the conductive element 16 which defines a first end of the conductive element and a second end of the conductive element. In some embodiments the conductive path or signal loop 16 is hidden by the frame of the apparatus casing 10 in such a way that the apparatus touch panel component parts are visible to the user the touch sensitive area only.

The apparatus 10 furthermore in some embodiments comprises input switches or buttons such as input button 1 14, input button 2 15 and input button 3 17 suitable for providing inputs to the apparatus via a user interface other than the touch panel 12.

The apparatus 10 furthermore in some embodiments comprises an earpiece hole 20 for enabling the output of acoustic waves generated via an acoustic or audio transducer located within the apparatus 10.

The apparatus may comprise in some embodiments a display component which may be configured to display information to the user either through the touch panel touch sensitive area 18 (for example by comprising a LCD display unit underneath the touch panel) or on the touch panel touch sensitive area 18 (for example a screen-printed or fixed display used to display characters).

Although the above features a touch panel component 12, it would be appreciated that the touch panel component may be a combined touch panel/display component with a capacity for providing display information to the user through or on the touch panel touch sensitive area 18.

The apparatus 10 may further comprise a processor which may be connected via suitable connections to the touch panel component 12.

The apparatus 10 may in some embodiments comprise an audio subsystem configured to output audio signals. The processor may in some embodiments be connected to the audio subsystem. The audio subsystem in some embodiments may comprise an acoustic or audio transducer, for example as part of a loudspeaker or earpiece, configured to generate acoustic waves dependent on electronic audio signals passed to the audio subsystem from the processor.

The processor in some embodiments is further linked to and the apparatus in some embodiments comprises a transceiver (TX/RX) suitable for transmitting and receiving data with further apparatus via a wireless communication protocol. Any suitable wireless communication protocol may be implemented in embodiments of the application.

The transceiver in some embodiments enables communication with other apparatus, for example via a cellular or mobile phone gateway service such as node B or base transceiver stations (BTS) and a wireless communications network, or short range wireless communications to other apparatus located remotely from the apparatus.

The apparatus in some embodiments can further comprise a memory to which the processor is connected. The processor may be configured to execute various program codes. The implemented program codes may in some embodiments control the operation of the signal loop 16. The implemented program codes may be stored for example in the memory for retrieval by the processor whenever needed. The memory in some embodiments may further provide a section for storing data.

It is understood that the structure of the apparatus 10 could be supplemented and varied in many ways and that the examples shown in FIG. 2 onwards represent only part of the operation of an apparatus comprising exemplary embodiments.

With respect to FIG. 2, a plan view of a touch panel component 12 is shown in further detail. The touch panel component 12 comprises the touch sensitive area 18 which as described above is configured to detect touch events. Furthermore the touch panel component comprises a touch sensor output 22 configured to carry touch sensor information (and in some embodiments data to the processor) for further processing. Furthermore in some embodiments where the touch panel component overlies a display component or is a combined touch panel/display component the touch sensor output connections 22 may carry display information from the processor to the display elements—for display within the touch sensitive area 18.

As described above, at least partially surrounding the touch sensitive area 18 is a conductive signal loop 16. The conductive signal loop 16 is configured to be a conductive loop implemented within or on the touch panel component 12.

The signal loop 16 may be any suitable conductive material. For example in some embodiments the signal loop may comprise a metallic film deposited over or on the touch panel component 12. In some other embodiments the signal loop may comprise a metallic film or foil layer sandwiched between layers forming the touch panel component 12. In some other embodiments the signal loop is formed from conductive foil or film structures adjacent to and formed during the manufacture of the touch panel component 12. A foil or film layer in these embodiments can be applied uniformly across the touch panel component 12 and to create the separate touch sensitive area 18 and signal loop 16 an area of the foil or film removed using for example etching to create a foil or film area capable of implementing a touch sensitive area 18 and a foil or film area capable of implementing the signal loop 16.

The signal loop 16 as shown in FIG. 2 may be connected in such a way that a first end of the signal loop is connected to a first audio signal input 26 and a second end of the signal loop is connected to a second audio signal input 26. In such embodiments, the first and second audio signal inputs are also passed to the audio or acoustic transducer 24. Thus a parallel connection in such embodiments transfers the audio signal input to the transducer 24 and also to the signal loop for generation of a magnetic field. The magnetic field generated is thus dependent on the audio signal passed to the transducer 24 and therefore when detected by a separate apparatus—for example a hearing aid with a further loop or coil, an audio signal, for example a voice conversation may be amplified by the hearing aid to assist the user.

With respect to FIGS. 7a, 7b, 7c and 7d, a range of electrical configurations are shown with respect to the signal loop as used in the audio induction (hearing aid) application. With respect to FIG. 7a, the parallel configuration as shown in FIG. 2 is shown whereby the signal loop 16 is connected such that a first end of the signal loop 16 is connected to one of the differential audio signal inputs from the amplifier 601 to the transducer 24 and the other end of the signal loop 16 is connected to the second audio input from the second output of the amplifier 601 to the transducer 24.

Figure 7A:
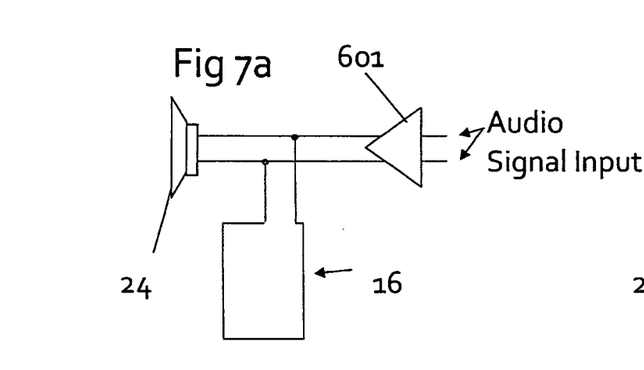
FIGS. 7a, 7b, 7c and 7d shows schematically electrical configurations associated with some embodiments of the application.
Figure 7B:
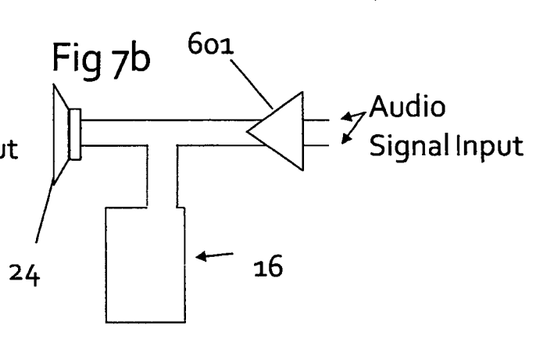

With respect to FIG. 7b, a series loop connection is shown whereby one end of the signal loop is connected to the output from the amplifier 601 and the other end of the signal loop 16 is connected to the transducer input 24. The series loop connection may be implemented in some embodiments as the connections require less material. Furthermore in the embodiments which feature series implementation, they typically require fewer additional components and are easy to implement from a software point of view.

Figure 7C:
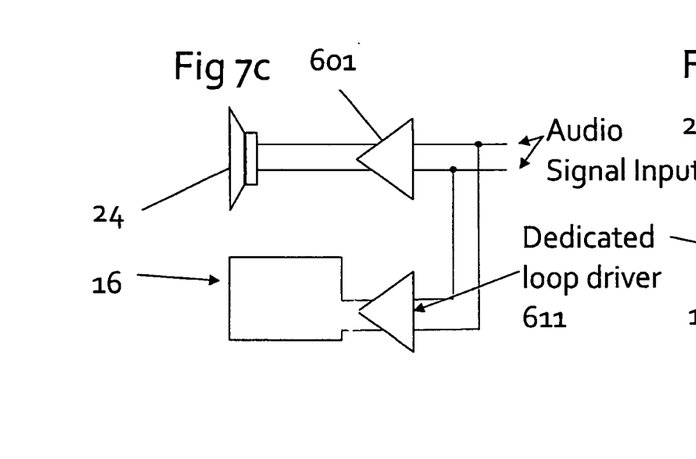

With respect to FIG. 7c, a third connection configuration is shown which may be used in some embodiments of the application. As shown in FIG. 7c the signal loop is connected in parallel, however the connection is implemented prior to the amplifier 601 and a dedicated loop driver 611 receives the parallel connection from the audio signal input and outputs an electrical signal to power the signal loop. In such embodiments the signal driving the signal loop 16 is separated by the use of the separate amplifier 601 and dedicated loop driver 611 from the signal driving the transducer 24.

Figure 7D:
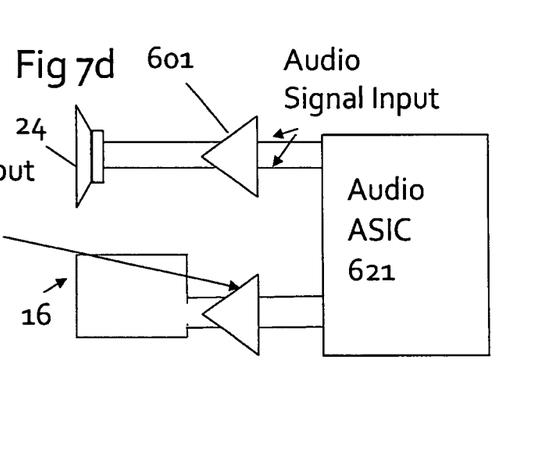

With respect to FIG. 7d, a fourth connection configuration is shown which may be used in some embodiments of the application. As shown in FIG. 7d the audio signal and the signal used to drive the signal loop are generated inside an ASIC 621. In such embodiments both the transducer/earpiece and the signal loop/coil can have dedicated output pins from the ASIC which provide the audio signal to the amplifier 601 and separately provide the induction signal to the dedicated loop driver 611. In some embodiments the ASIC may implement the functionality of the amplifier 601 and dedicated loop driver 611 internally. The ASIC may also implement in some embodiments an audio input/output functionality, in other words the ASIC comprising a codec, an amplifier or drivers, and a filter.

By using conductive signal loop (which may be manufactured in some embodiments as a foil, film or layers) at the peripheral part of the touch display the construction of a signal loop is greatly simplified and may be manufactured as one of the processes used to generate the touch panel component 12. Furthermore such embodiments allow the further reduction in size of circuit boards within the apparatus as signal loop need not be created on them. Also in such embodiments the volume of the apparatus may be reduced-in comparison with free standing coil or loop devices as volume is not required within the device for the additional wiring or loops. Furthermore as the touch panel component 12 is typically designed to provide as large as possible an area with respect to the size of the apparatus 10 then the loop is also relatively large with respect to the size of the apparatus.

In such embodiments as described in the application the large area provided by the touch panel allows manufacturing of coils whose magnetic field widen the "sweet spot" area where a Hearing Impaired person can have a comfortable zone to catch and/or pass the signal with the loop.

Figure 3:
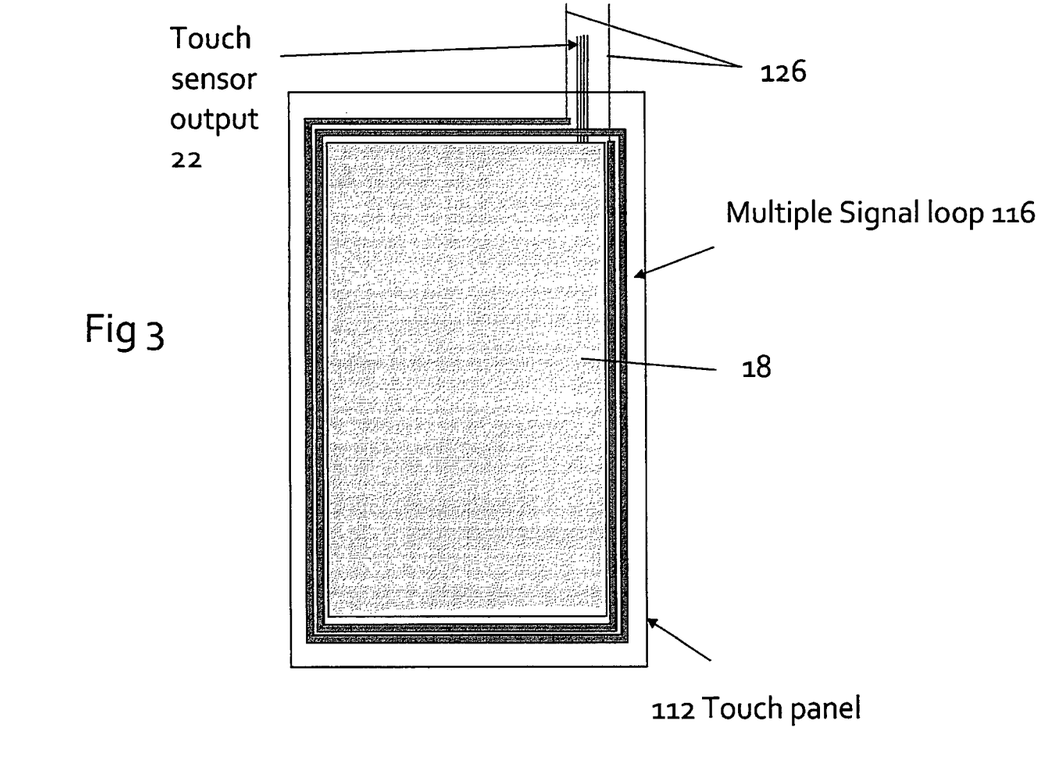
FIG. 3 shows schematically the touch sensor component shown in FIG. 1 in further detail according to some further embodiments.

With respect to FIG. 3 a further example loop according to some embodiments of the touch panel component is shown. The touch panel component 112 is similar to the touch panel component 12 shown in FIG. 2 in that it comprises a touch sensitive area 18 which is configured to detect touch events. Furthermore the touch sensitive area is connected to a touch sensor output connector 22 configured to output touch sensor data. Furthermore the touch sensitive area 18 is shown surrounded by a signal loop 116. In the example shown with respect to FIG. 3, the signal loop is configured as a multiple loop, constructed from a peripheral spiral of conductive foil and thus may be implemented within or from a single layer of the conductive material. Thus one end of the multiple signal loop 116 is an inner end which may be configured to be connected to a first audio signal input via a first connector and at the other end of the multiple signal loop 116, an outer end, may be connected to a second audio signal input via a second connector. The two connectors as similarly shown in FIG. 2 can be configured in some embodiments to connect to the audio signal passed to the audio or acoustic transducer and thus induce a magnetic field dependent on the audio signal. However it would be appreciated that connection configurations similar to those described above and shown in FIGS. 7a to 7d may be implemented with the loop structure shown above.

As the embodiments shown show a signal loop comprising multiple loops of conductive material (foil or film) the multiple loop signal loop would all other factors considered produce a stronger magnetic field than a single loop signal loop such as shown in FIG. 2.

Figure 4:
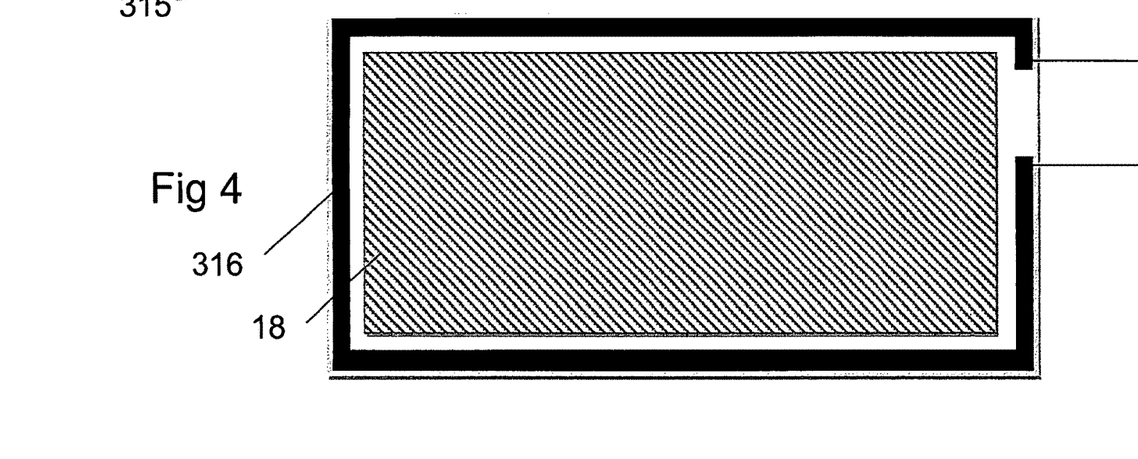
FIG. 4 shows schematically the touch sensor component shown in FIG. 2 in further detail according to some further embodiments.

With respect to FIG. 4, a further example of the touch panel component 112 is shown where a multi-loop signal loop is constructed from more than one layer each layer comprising a single signal loop. The touch panel12 is shown both by a front view wherein the touch panel component 12 appears similar to the touch panel component shown in FIG. 2 whereby the uppermost touch sensitive area 18 layer is shown is substantially surrounded by a single loop conductive loop portion 316. Furthermore with respect to FIG. 4 an end-on view of the touch panel component 12 is shown wherein the touch panel component 12 is shown in further detail and shown comprising multiple layers.

The first layer 301 which in some embodiments is the top or uppermost layer in that it faces away from the apparatus 10 core, the front window layer, may be manufactured from glass. In some embodiments the glass may be coated with optical (to reduce glare) and/or oleophobic (to resist fingerprints) film to enhance the characteristics of the front window layer 301. The front window layer 301 in these embodiments overlays the other layers and is configured to protect the other layers.

In some other embodiments of the front window layer 301 can be manufactured from a plastic or other protective screen material suitable to enable the other layers to perform their tasks and also protect the other layers from physical or other damage.

For example the front window layer 301 may in some embodiments provide a dielectric material between a lower capacitive touch interface layers and the user's finger while the front window layer 301 is also sufficiently transparent to permit any display elements under the layer being seen by the user.

Underneath the front window layer 301 may be a first indium tin oxide (ITO) on polyethylene terephthalate (PET) polyester film layer 303. In some embodiments the PET film may be biaxially orientated polyethylene terephthalate which may be used because of its high tensile strength, chemical and dimensional stability, transparency and also electrical insulation properties. The indium tin oxide may be configured suitably in order to produce both a first capacitive touch interface layer and also a first conductive loop of the signal loop 316. For example the ITO layer may be deposed on the PET layer as a single layer and a suitable blanking or etching removing the ITO areas required to create separate loop and touch sensitive areas.

Furthermore a first layer of ITO on PET 303 may be physically connected in some embodiments to a second layer of ITO on PET 307 via a layer of optically clear adhesive (OCA) 305.

The second ITO on PET layer 307 may be manufactured in some embodiments with a similar profile to the first ITO on PET layer 303 so to provide a second capacitive touch interface layer and also a second conductive loop (of the signal loop) substantially surrounding the second capacitive touch interface touch sensitive area. The second layer of ITO on PET 307 may be further connected in some embodiments to a third layer of ITO on PET 311 via a second layer of optically clear adhesive 309.

The third layer of ITO on PET 311 may also be manufactured with a similar profile or structure to that of the first and second ITO on PET layers to provide a third capacitive touch interface layer and conductive loop.

The third ITO on PET layer 311 may be connected to a fourth layer of ITO on PET 315 via a third layer of optically clear adhesive (OCA) 313. The fourth ITO on PET layer 315 in these embodiments using similar manufacturing masks may provide a fourth capacitive touch interface layer and conductive loop.

It would be understood that while four separate ITO on PET layers are shown by this example in some other embodiments more than four or less than four loops may be created by using more or fewer ITO on PET layers. Similarly it would be understood that on not all ITO on PET layers comprise both a touch sensitive interface part and conductive loop. For example in some embodiments some ITO on PET layers comprise only a conductive loop and some ITO on PET layers comprise only a touch sensitive interface part The layers of ITO on PET may in some embodiments be connected together using an interconnect structure 317. The interconnect structure 317 in some embodiments is configured so that a first end of a loop of a first layer is connected to second end of a second loop from a second layer and further that the second loop first end of the second layer is connected to a third layer second end third loop and so on. In other words in such embodiments the single signal loops are connected in series thus enabling multiple signal loop configurations to be manufactured using a single loop per layer and thus a much simpler structure per layer to be manufactured.

It would be appreciated that although the description features some embodiments made from ITO on PET any suitable structure whereby a conductive loop can be manufactured within or deposited on the touch interface layers can be constructed.

The multiple layer embodiments as described above are particularly useful as currently electronic devices with touch screen interfaces use multiple layers in order to provide multi-touch interface input data and thus embodiments such as shown above may use these multiple layers to further improve the magnetic strength generated by the signal loop with little additional manufacturing cost.

It would be appreciated that in some embodiments of the application, multiple loop signal loops may be manufactured not only from using single loop per multiple layers as shown with respect to FIG. 4, but also multiple loop structures on each layer as shown in FIG. 3 to further produce even stronger magnetic field components.

Beneath the layers 303, 307, 311 and 313 may in some embodiments be located any active display layers where for example light guide layers may project light (which may be a defused light source) towards the user. In other embodiments the display layer may be a direct light generating source such as a light emitting diode (LED) array or organic light emitting diode (OLED) array suitable for directly generating the light for the display and passing it through the ITO on PET layers.

Although the signal loop is described above as being an ITO on PET layer conductive path, it would be appreciated that the conductive layer may be configured to be manufactured from any suitable conductive material deposed on or over the touch panel components. For example as described previously where the signal loop/coil is hidden by the surrounding frame of the apparatus 10, the signal loop/coil can be printed with a material other than Indium Tin Oxide which may have better electrical performance or are cheaper to manufacture. An example may thus be a metallic foil attached at least partially surrounding the display area 18 to provide the signal loop/coil components. Similarly where the touch panel in some embodiments is a semi conductor structure, for example a solid state or silicon touch sensor, then the conductive path may be manufactured from a metallic layer deposed on the surface or within the structure. In some other embodiments a suitability doped semiconductor material layer may be used to provide the signal loop/coil.

It would be appreciated that as well as being suitable for magnetic field induction when applied to hearing aids and in some embodiments other suitable short range audio connections, the apparatus comprising a touch panel with a signal loop/coil may have further applications.

Figure 5:
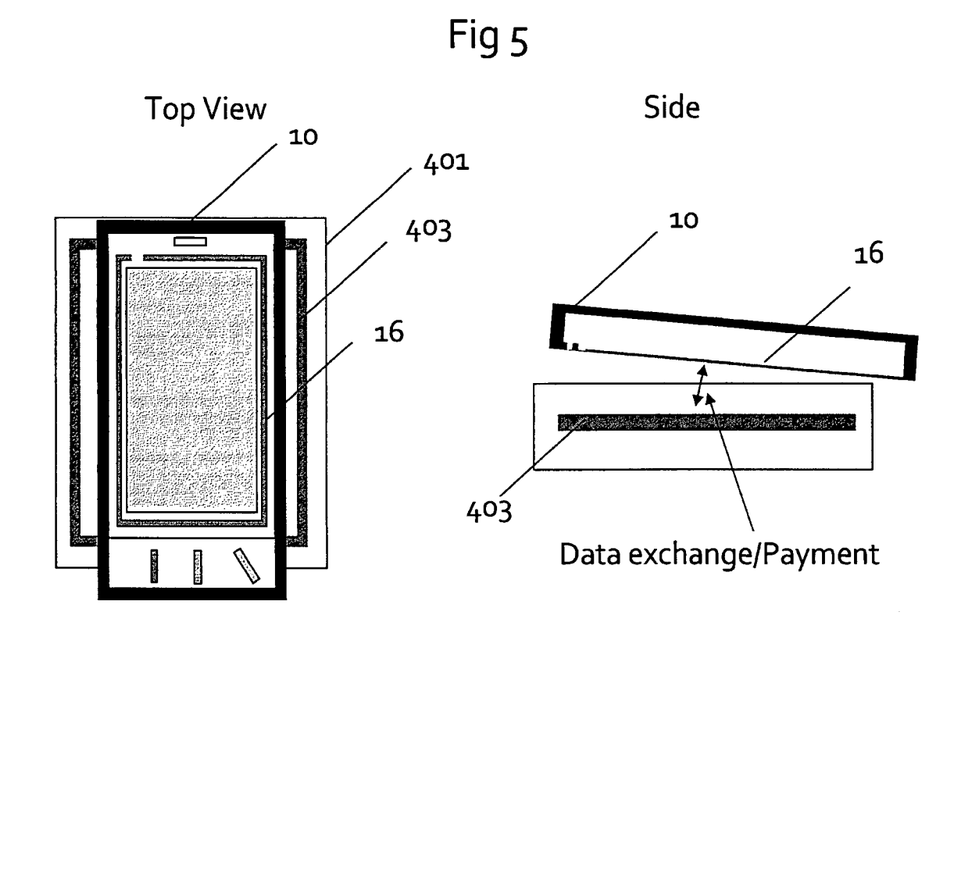
FIG. 5 shows schematically a data exchange example implementation of some embodiments of the application.

With respect to FIG. 5, a first further application of embodiments of the application is shown. In a first further application of some embodiments the apparatus 10 may be configured to provide some form of data exchange using the signal loop 18 to a data panel 401.

In such embodiments the apparatus 10 may thus be configured to operate as a contactless payment device whereby when the device is passed near to a data point 401, a signal coil 403 within the data device 401 communicates with the apparatus via the apparatus signal coil 16. Furthermore the touch sensitive panel 18 may be used to detect user input, for example acceptance of a contactless payment or acceptance of a contactless credit. Although the above example involves the use of a contactless payment device, other forms of data exchange may be implemented using the apparatus and signal loop. For example the apparatus may be configured to provide secure access to secure areas based on the information stored within the apparatus 10 when detected at a security point equipped with a data panel 401 with a signal coil. Similarly in some embodiments the apparatus 10 may be used as an electronic wallet suitable of storing credit wherein the electronic wallet comprises a touch panel for authorizing payments from the electronic wallet and in some embodiments communicating with further apparatus to deposit electronic credits to the electronic wallet. Furthermore in some embodiments the apparatus may be used as a contactless key for accessing a suitably configured ATM so to replace the physical contact cards currently used.

Similarly it would also be appreciated that the apparatus in some embodiments may be configured to communicate with another apparatus or mobile phone equipped with a similar induction loop. In such embodiments the another apparatus or mobile phone may be a conventional signal loop device (for example the signal loop being located in the earpiece module or on the circuit board or in fact, any Near Field Communication (FNC) antenna. Furthermore the another apparatus can in some embodiments comprise a signal loop or coil printed on the touch panel of the another apparatus similar to that described above. For example the apparatus may be the electronic credit payment device whereby when presented with a further inductive device enables the user to 'charge' their electronic wallet account, or an ATM touch screen console which when presented nearby with a suitable inductive access key when authorized provides access to a users financial account.

Figure 6:
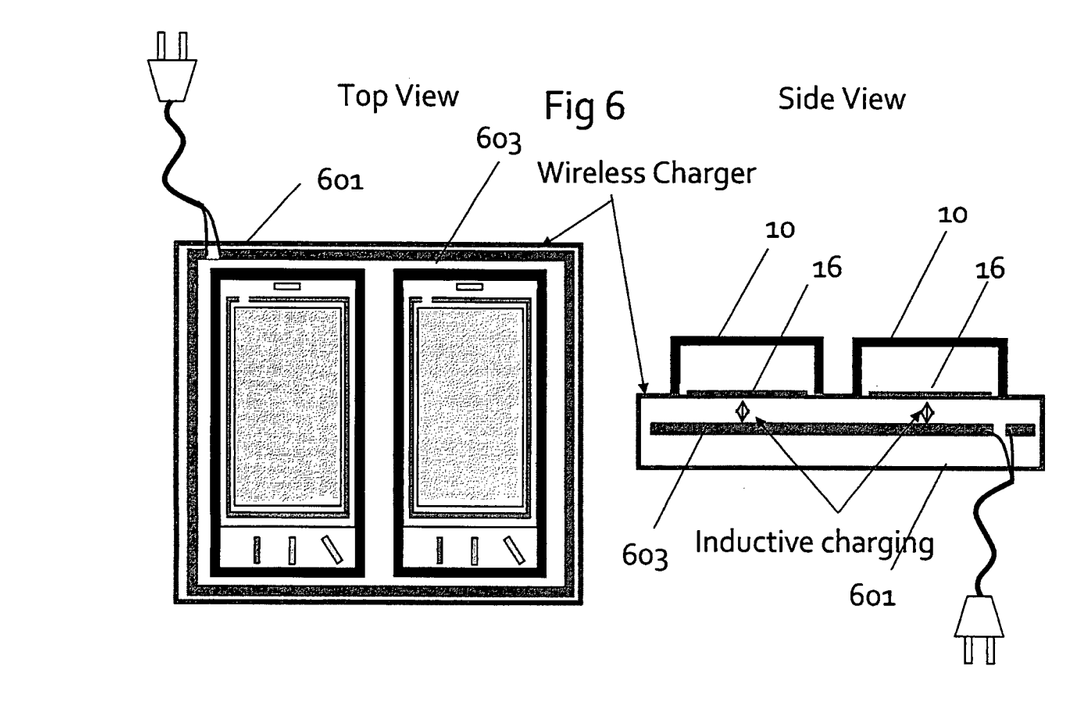
FIG. 6 shows schematically a wireless charging example implementation of some embodiments of the application.

Furthermore with respect to FIG. 6, a second further application of embodiments of the application can be shown. In the example shown in FIG. 6, the apparatus 10 and the signal loop 16 is configured to detect and receive energy from an inductive source loop 603 located within a wireless charger 601. In other words the wireless charger 601 is configured to generate a magnetic field which induces a charge within the signal loop 16 of the apparatus 10 which may be then used to charge the internal battery of the apparatus 10 without requiring any cables.

Thus in these embodiments, when the apparatus 10 detects a significantly strong magnetic field there may be a switching into a charging mode whereby the apparatus disconnects the signal pathways from the signal loop 16 and connects a charging pathway via a voltage regulator to the battery stored within the apparatus 10.

Figure 8:
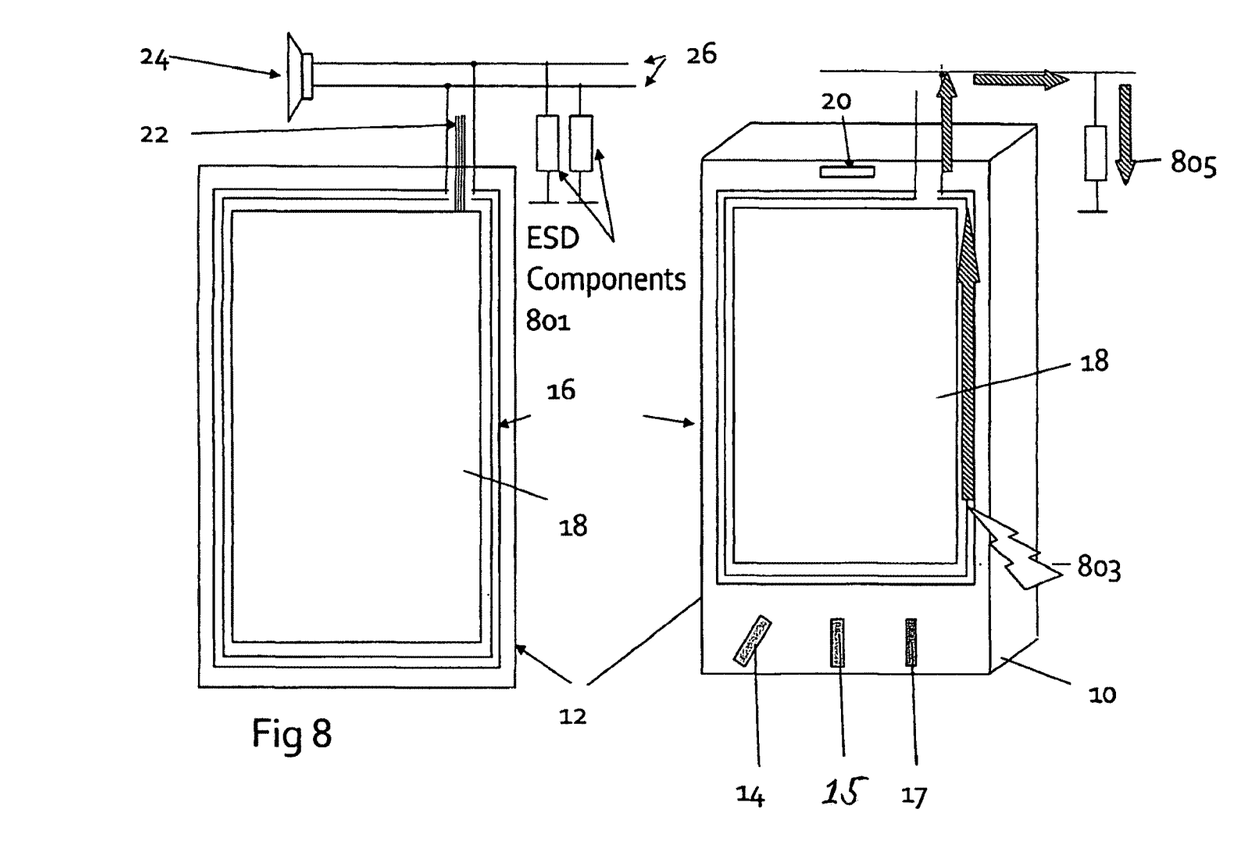
FIG. 8 shows schematically an electrostatic discharge (ESD) protection example implementation of some embodiments of the application.

With respect to FIG. 8 a further application of some embodiments is shown. The apparatus 10 and in particular the touch panel component 12 is shown having a similar structure to the apparatus shown in FIG. 1 and the touch panel component 12 specifically shown in FIG. 2. However, in these embodiments the audio signal inputs are each further connected to an electrostatic discharge (ESD) protection component 801. The electrostatic discharge component 801 is configured to provide a protective path to ground and may comprise any suitable component such as a varistor, a Zener diode, or a transient voltage suppression (TVS) diode. The ESD components 801 as described previously are configured to operate such that when they experience a sufficiently high potential they become conductive and thus discharge any potentially damaging spark to ground whereas if the potential is below a potentially damaging value then the electrostatic discharge component has a high resistance which does not interfere with the normal operation of the signal loop.

The electrostatic discharge components 801 thus protect the touch sensitive area 18 from electrostatic discharge damage as any electrostatic discharge spark 803 is conveyed along the signal loop and through the electrostatic discharge component 801 to ground as shown by the arrows 805.

Figure 9:
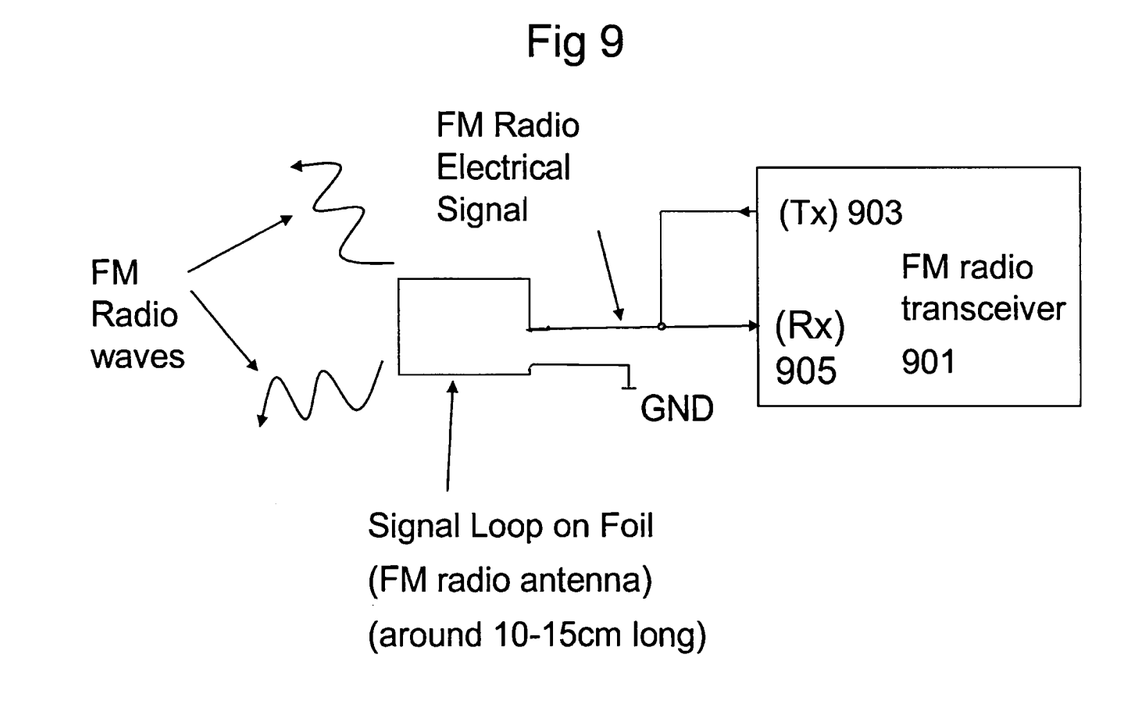
FIG. 9 shows schematically an antenna configuration example implementation of some embodiments of the application.

With respect to FIG. 9 a further example of the use of the signal loop is shown where the signal loop is used as a frequency modulation (FM) antenna. The signal loop 16 which is in some embodiments for example approximately 10 to 15 cm or of a dimension suitable for emitting and receiving FM radio waves and further are connected at one end to ground and at the other end to a frequency modulation radio transceiver 901. The frequency modulation radio transceiver 901 comprises a transmitter portion 903 which outputs to the signal loop 16 and a receiver portion 905 which receives signals from the signal loop. It would be appreciated that any suitable radio frequency transmitter or receiver would also be possibly connected to the signal loop.

Figure 10:
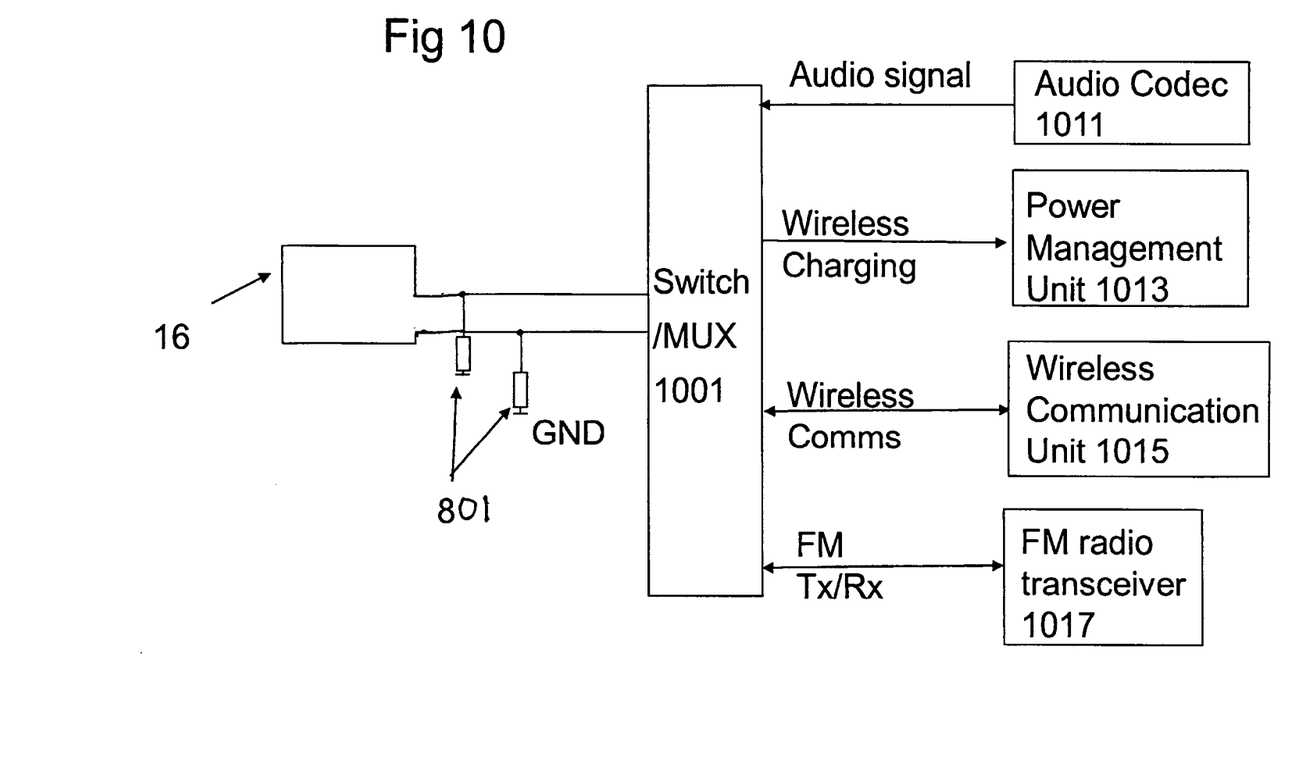
FIG. 10 shows schematically a multiple example switching configuration implementation of some embodiments of the application.

Furthermore with respect to FIG. 10, a schematic view of some embodiments showing the signal loop operating with and being suitable for switching between multiple applications is shown. The signal loop 16 is in these embodiments is connected via the ESD components 801 to ground so to protect the touch sensitive area 18 from damage.

The signal loop 16 is furthermore in these embodiments connected to a switch/multiplexer 1001. The switch/multiplexer is configured to connect the signal loop 16 to drivers, for providing a signal for driving the signal loop, and/or sensors, for receiving signals from the signal loop.

The switch/multiplexer 1001 in some embodiments may be controlled either manually by the user, automatically dependent on the signal passed to or from the signal loop, semi-automatically where the user assists in the choice of a connection.

The switch/multiplexer 1001 thus as shown in FIG. 10 can be connected to an audio codec 1011, a power management unit 1013, a wireless communication unit 1015, and a FM radio transceiver 1017. It would be appreciated that in some other embodiments different other units may be connected other than shown in FIG. 10.

Thus for example when the induction loop is to be connected to induce a magnetic field for a HAC application the audio codec 1011 may be connected to the signal loop via the switch/multiplexer 1001.

Similarly when the signal loop 16 is to be used to charge the apparatus or supply charge to another apparatus the loop 16 may be connected to the power management unit 1013. Thus for example as described above in some embodiments when a field strength of sufficient strength is detected the power management unit 1013 is configured to condition the potential and current to charge up any internal battery or power the device without needing any power cable. Similarly the power management unit 1013 may be configured to drive the signal loop 16 via the switch in order to generate a magnetic field sufficient for inducing a current in a further apparatus and therefore powering or charging the further apparatus. For example the apparatus may be a laptop personal computer or similar where the loop is implemented as part of the display. In such embodiments when the laptop is plugged in but not being used it would be possible to place further apparatus, such as mp3 players, mobile phones, with induction loop implementation onto the laptop to charge the devices without need for multiple power cables.

Furthermore when the signal loop 16 is to be used in a data communication mode the signal loop 16 may be connected via the switch/multiplexer 1001 to the wireless communication unit 1015, and when the apparatus is to be used as a frequency modulation radio transceiver the signal loop 16 may be connected to the FM radio transceiver 1017 via the switch/multiplexer 1001. In such embodiments it would be appreciated that as described above the switch/multiplexer 1001 connects one of the end connections from the signal loop to ground and the other end of the loop connected to the transceiver 1017.

Hence in at least one embodiment there may be a method comprising: presenting visual information with a display, and providing an induction coil electrically isolated but located on or in the display. Wherein the display may further be a touch sensitive one suitable for providing touch interface input.

It shall be appreciated that the term electronic device and user equipment is intended to cover any suitable type of wireless user equipment, such as mobile telephones, portable data processing devices or portable web browsers.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Thus in at least one of the embodiments there is an apparatus comprising a display component comprising at least one display part and an electrically conductive part electrically isolated from the at least one display part. In at least one of these embodiments the conductive part is adjacent to and at least partially surrounds the at least one display part. Furthermore the conductive part is configured to form an induction coil in at least one of these embodiments. The induction coil is in at least one of the embodiments a single loop of conductive material, and in at least a further embodiment at least two loops of conductive material, wherein the at least two loops of conductive material are at least one of: a single layer comprising at least two loops of conductive material; and at least two serially connected layers, each layer comprising at least one loop of conductive material.

Furthermore in such embodiments at least one may further comprise at least one electrostatic discharge component, the conductive part being configured to be connected to the at least one electrostatic discharge component, and the conductive part and electrostatic discharge component configured to provide a discharge path to protect the display part.

Also in at least one of these embodiments the apparatus may further comprise a radio frequency transceiver, the conductive part being configured to be connected to the radio frequency transceiver, and the conductive part configured to provide an antenna path for the radio frequency transceiver.

Similarly in at least one of these embodiments the apparatus may further comprise a power management unit, the conductive part being configured to be connected to the power management unit, wherein the conductive part is configured to magnetically transfer power between the apparatus and at least one further apparatus.

The apparatus in at least one of the embodiments may further comprise an audio signal generator, the conductive part being connected to the audio signal generator, wherein the conductive part is configured to magnetically transfer the output of the audio signal generator to at least one further apparatus.

As described above thus in at least one of the embodiments the conductive part is configured to generate a hearing aid compatible magnetic field.

Also where the display component comprises at least one layer the at least one display part and the electrically conductive part are located on or in at least one of the at least one layer.

The display component as described above comprises a touch interface display and the display part comprises at least one touch sensitive part.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

Hence in at least one embodiment there is provided a computer-readable medium encoded with instructions that, when executed by a computer perform: presenting visual information with a display; and controlling an induction coil electrically isolated but located on or in the display.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits (such as field programmable gate array—FPGA circuits) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term 'circuitry' refers to all of the following:
(a) hardware-only circuit implementations (such as implementations in only analog and/or digital circuitry) and
(b) to combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. An apparatus comprising:
a touch panel comprising at least one electrically conductive layer having at least one electrically conductive part thereof that is electrically isolated on the at least one electrically conductive layer, where the at least one electrically conductive layer comprises a touch sensitive foil, wherein the at least one electrically conductive part is configured to generate magnetic field energy of a hearing aid compatible (HAC) magnetic field so as to communicate with a hearing aid, wherein the at least one electrically conductive part is configured to form a hearing aid compatible (HAC) induction coil configured to transmit a magnetic field induction signal comprising data from the HAC induction coil, where the HAC induction coil is printed around an edge of the touch sensitive foil and the HAC induction coil at least partially surrounding the at least one electrically conductive layer; and
an audio signal generator, the at least one electrically conductive part being connected to the audio signal generator, wherein the at least one electrically conductive part is configured to magnetically transfer an output of the audio signal generator to the hearing aid based on the magnetic field energy.

2. The apparatus as claimed in claim 1, wherein the at least one electrically conductive part is adjacent to and at least partially within the at least one electrically conductive layer.

3. The apparatus as claimed in claim 1, wherein the HAC induction coil comprises at least a single loop of conductive material on a corresponding at least one electrically conductive display layer.

4. The apparatus as claimed in claim 3, further comprising an additional loop wherein at least two loops of conductive material are at least one of:
a single layer comprising at least two loops of conductive material; and
at least two serially connected layers, each layer comprising at least one loop of conductive material.

5. The apparatus as claimed in claim 1, further comprising at least one electrostatic discharge component, the at least one electrically conductive part is connected to the at least one electrostatic discharge component, wherein the at least one electrically conductive part and electrostatic discharge component are configured to provide a discharge path to protect the at least one electrically conductive layer.

6. The apparatus as claimed in claim 1, further comprising a radio frequency transceiver, the at least one electrically conductive part is connected to the radio frequency transceiver, wherein the at least one electrically conductive part is configured to provide an antenna path for the radio frequency transceiver.

7. The apparatus as claimed in claim 1, further comprising a power management unit, the at least one electrically conductive part being connected to the power management unit, wherein the at least one electrically conductive part is configured to magnetically transfer power between the apparatus and the at least another apparatus.

8. The apparatus as claimed in claim 1, further comprising a transducer to generate acoustic waves wherein the transducer is connected to the audio signal generator.

9. The apparatus as claimed in claim 8, wherein the output of the audio signal generator is at least one audio signal.

10. The apparatus as claimed in claim 1, wherein the at least one electrically conductive part is formed on electrically insulating material forming at least part of the at least one electrically conductive layer and is configured to generate the hearing aid compatible (HAC) magnetic field.

11. The apparatus as claimed in claim 1, wherein the at least one electrically conductive part is charged when at least another apparatus generates the magnetic field energy and the at least one electrically conductive part charges an internal battery of the apparatus based on the magnetic field energy.

12. The apparatus as claimed in claim 1, further comprising at least one display part, wherein the at least one electrically conductive part is on the at least one display part.

13. The apparatus as claimed in claim 1, wherein the touch panel component comprises at least one touch sensitive part.

14. A method comprising:
providing a touch panel component comprising at least one electrically conductive layer having at least one electrically conductive part thereof that is electrically isolated on the at least one electrically conductive layer, where the at least one electrically conductive layer comprises a touch sensitive foil, wherein the at least one electrically conductive part is configured to generate magnetic field energy of a hearing aid compatible (HAC) magnetic field so as to communicate with a hearing aid, wherein the at least one electrically conductive part is configured to form a hearing aid compatible (HAC) induction coil configured to transmit a magnetic field induction signal comprising data from the HAC induction coil, where the HAC induction coil is printed around an edge of the touch sensitive foil and the HAC induction coil at least partially surrounding the at least one electrically conductive layer; and
connecting an audio signal generator to the HAC induction coil of the touch panel component, wherein the at least one electrically conductive part is configured to magnetically transfer an output of the audio signal generator based on the magnetic field energy.

\* \* \* \* \*

UNITED STATES PATENT AND TRADEMARK OFFICE
CERTIFICATE OF CORRECTION

PATENT NO. : 9,602,165 B2
APPLICATION NO. : 13/576402
DATED : March 21, 2017
INVENTOR(S) : Greuet Page 1 of 1

It is certified that error appears in the above-identified patent and that said Letters Patent is hereby corrected as shown below:

In the Claims

Claim 1, Column 14, Line 13 --component-- should be inserted after "panel".

Signed and Sealed this
Fourth Day of July, 2017

Joseph Matal
*Performing the Functions and Duties of the
Under Secretary of Commerce for Intellectual Property and
Director of the United States Patent and Trademark Office*